United States Patent [19]

Aziz et al.

[11] 3,997,709

[45] Dec. 14, 1976

[54] POLYMERIZATES OF OLEFINIC NITRILES

[75] Inventors: Walid Y. Aziz, Warrensville; Lawrence E. Ball, Cuyahoga Falls; George S. Li, Aurora, all of Ohio

[73] Assignee: Standard Oil Company, Cleveland, Ohio

[22] Filed: Dec. 24, 1975

[21] Appl. No.: 644,123

[52] U.S. Cl. .............................. 526/280; 526/268
[51] Int. Cl.$^2$ ...................................... C08F 234/02
[58] Field of Search ............. 260/80.72, 80.78, 81; 526/280, 268

[56] References Cited

UNITED STATES PATENTS

| | | | |
|---|---|---|---|
| 2,537,626 | 1/1951 | Eberly et al. | 260/80.78 |
| 2,833,746 | 5/1958 | Haefner | 260/80.78 |
| 3,926,926 | 12/1975 | Li et al. | 260/81 |

*Primary Examiner*—Harry Wong, Jr.
*Attorney, Agent, or Firm*—John F. Jones; Sherman J. Kemmer

[57] ABSTRACT

Polymeric resins which are high softening and function as gas and vapor barrier materials are composed of an olefinically unsaturated nitrile, such as acrylonitrile, isobutylene, and indene.

6 Claims, No Drawings

POLYMERIZATES OF OLEFINIC NITRILES

The present invention relates to novel polymeric compositions which have low permeability to gases, and high-softening temperatures, and more particularly pertains to high-softening compositions which function as gas and vapor barrier materials and are composed of the essential components of an olefinically unsaturated nitrile, isobutylene, and indene, and to a process for preparing them.

The novel polymeric products of the present invention are prepared by polymerizing a major portion of an olefinically unsaturated nitrile, such as acrylonitrile, and a minor portion of isobutylene (isobutene), and indene.

The olefinically unsaturated nitriles useful in this invention are the alpha,beta-olefinically unsaturated mononitriles having the structure

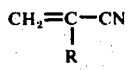

wherein R is hydrogen, a lower alkyl group having from 1 to 4 carbon atoms, or a halogen. Such compounds include acrylonitrile, alpha-chloroacrylonitrile, alpha-fluoro-acrylonitrile, methacrylonitrile, ethacrylonitrile, and the like. The preferred olefinically unsaturated nitrile in the present invention is acrylonitrile.

Indene (1-H-indene) and coumarone (2,3-benzofuran) and mixtures are useful as monomers in the present invention. Most preferred is indene.

The polymeric compositions of the present invention can be prepared by any of the known general techniques of polymerization, including the bulk polymerization, solution polymerization, and emulsion or suspension polymerization techniques by batch, continuous or intermittent addition of the monomers and other components. The preferred method is emulsion polymerization. The polymerization is preferably carried out in an aqueous medium in the presence of an emulsifier and a free-radical generating polymerization initiator at a temperature of from about 0° to 100° C in the substantial absence of molecular oxygen.

The preferred polymeric compositions embodied herein are those resulting from the polymerization of (A) about 60 to 90% by weight of at least one nitrile having the structure

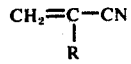

wherein R has the foregoing designation, (B) from 10 to 39% by weight of isobutylene, and (C) from 1 to 15% by weight of at least one member selected from the group consisting of indene and coumarone wherein the given percentages of (A), (B), and (C) are based on the combined weight of (A), (B), and (C).

More specifically, the present invention can be illustrated in the polymerization of a mixture of acrylonitrile, isobutylene, and indene to produce a product having exceptionally good impermeability to gases and vapors, and improved ASTM heat-distortion temperature. Preferably, the acrylonitrile-isobutylene-indene monomer component should contain 70 to 90 by weight of acrylonitrile, 10 to 29% by weight of isobutylene, and 1 to 15% by weight of indene.

The novel polymeric products of the present invention are thermoplastic materials which can be thermoformed into a wide variety of useful articles in any of the conventional ways employed with known thermoplastic polymeric materials, such as by extrusion, milling, molding, drawing, blowing, etc. The polymeric products of this invention have excellent solvent resistance, and their low permeability to gases and vapors make them useful in the packaging industry, and they are particularly useful in the manufacture of bottles, film, and other types of containers for liquids and solids.

In the following illustrative examples the amounts of ingredients are expressed in parts by weight unless otherwise indicated.

EXAMPLE 1

A batch charge emulsion polymerization was carried out using the following ingredients and procedure:

| Ingredient | Parts |
| --- | --- |
| acrylonitrile | 70 |
| isobutylene | 20 |
| indene | 10 |
| water | 250 |
| potassium persulfate | 0.3 |
| Gafac RE-610* (emulsifier) | 3 |

*A mixture of $R-O-(CH_2CH_2O-)_nPO_3M_2$ and $[R-O-(CH_2CH_2O-)_n]_2PO_2M$ wherein n is a number of from 1 to 40, R is an alkyl or alkaryl group and preferably a nonyl phenyl group, and M is hydrogen, ammonia or an alkali metal, which composition is sold by the GAF Corporation.

The polymerization was carried out in the substantial absence of molecular oxygen (nitrogen purging of the polymerization reaction mixture) at 60° C. The resulting resin was recovered from its latex by coagulation at 98.5° C with aqueous alum solution and was washed and dried to give a yield of 95% by weight. The dry resin was compression molded into test bars and films which were found to have the following properties: ASTM heat-distortion temperature 83° C, tensile strength $10 \times 10^3$ psi, flexural strength $19 \times 10^3$ psi, flexural modulus $5.1 \times 10^5$ psi, ASTM oxygen transmission rate 0.02, and ASTM water vapor transmission rate of 3.59.

EXAMPLE 2

The procedure of Example 1 was repeated using as monomers 66.7 parts of acrylonitrile, 19 parts of isobutylene and 14.3 parts of indene. The resulting resin was found to have an ASTM heat-distortion temperature of 86° C, flexural strength of $14 \times 10^3$ psi and flexural modulus of $5.31 \times 10^5$ psi.

EXAMPLE 3

The procedure of Example 1 was repeated using as monomers 63.6 parts of acrylonitrile, 18.2 parts of isobutylene and 18.2 parts of indene. The resulting resin was found to have an ASTM heat-distortion temperature of 93° C, flexural strength of $10.9 \times 10^3$ psi and flexural modulus of $5.2 \times 10^5$ psi.

EXAMPLE 4

The procedure of Example 1 was repeated using as monomers 73.7 parts of acrylonitrile, 21 parts of isobutylene and 5.3 parts of indene. The resulting resin was found to have an ASTM heat-distortion temperature of 75° C, flexural strength of 16.7 × 10³ psi and flexural modulus of 5.03 × 10⁵ psi.

EXAMPLE 5

A resin was prepared which is outside the scope of the present invention by repeating the procedure of Example 1 using as monomers 80 parts of acrylonitrile and 20 parts of isobutylene. The resulting resin was found to have an ASTM heat-distortion temperature of 62° C, a flexural strength of 10 × 10³ psi, and a flexural modulus of 3 × 10⁵ psi, tensile strength of 2.28 × 10³ psi and ASTM oxygen transmission rate of 1.12.

We claim:

1. The terpolymer composition resulting from the copolymerization in an aqueous medium with a free-radical initiator in the substantial absence of oxygen of
  A. from about 60 to 90% by weight of at least one nitrile having the structure

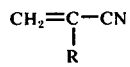

wherein R is hydrogen, a lower alkyl group having from 1 to 4 carbon atoms, or a halogen,
  B. from about 10 to 39% by weight of isobutylene, and
  C. from about 1 to 15% by weight of at least one member selected from the group consisting of indene and coumarone
wherein the given percentages of (A), (B), and (C) are based on the combined weight of (A), (B), and (C).

2. The composition of claim 1 wherein (A) is acrylonitrile.

3. The composition of claim 2 wherein (C) is indene.

4. The process comprising copolymerizing in aqueous emulsion with a free-radical initiator in the substantial absence of molecular oxygen
  A. from about 60 to 90% by weight of at least one nitrile having the structure

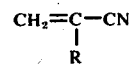

wherein R is hydrogen, a lower alkyl group having from 1 to 4 carbon atoms, or a halogen,
  B. from about 10 to 39% by weight of isobutylene, and
  C. from about 1 to 15% by weight of at least one member selected from the group consisting of indene and coumarone
wherein the given percentages of (A), (B), and (C) are based on the combined weight of (A), (B), and (C), and recovering the resinous product.

5. The process of claim 4 wherein (A) is acrylonitrile.

6. The process of claim 5 wherein (C) is indene.

* * * * *